(12) United States Patent
Sadiku

(10) Patent No.: US 7,185,414 B2
(45) Date of Patent: Mar. 6, 2007

(54) APPARATUS FOR FORMING WAVE WINDINGS FOR ROTOR AND STATOR LAMINATION PACKETS OF ELECTRICAL MACHINES

(75) Inventor: Sadik Sadiku, Neuberg (DE)

(73) Assignee: Elmotec Statomat Vertriebs GmbH, Karben (DE)

( * ) Notice: Subject to any disclaimer, the term of this patent is extended or adjusted under 35 U.S.C. 154(b) by 593 days.

(21) Appl. No.: 10/635,903

(22) Filed: Aug. 7, 2003

(65) Prior Publication Data
US 2004/0261885 A1 Dec. 30, 2004

(30) Foreign Application Priority Data
Jun. 27, 2003 (DE) ................. 103 28 955

(51) Int. Cl.
  H02K 15/02 (2006.01)
  H02K 15/10 (2006.01)
(52) U.S. Cl. ............... 29/598; 29/596; 29/605; 29/606; 72/191; 140/92.1; 140/92.2; 140/105
(58) Field of Classification Search .......... 29/598, 29/596, 605, 606; 72/191; 140/92.1, 92.2, 140/105
See application file for complete search history.

(56) References Cited

U.S. PATENT DOCUMENTS

| | | | |
|---|---|---|---|
| 3,760,851 A | 9/1973 | Schmidt et al. | |
| 4,047,544 A | 9/1977 | Seaborn et al. | |
| 4,373,558 A | * | 2/1983 | Dawson .................. 140/71 R |
| 4,399,843 A | * | 8/1983 | Sedgewick .............. 140/92.2 |
| 4,763,053 A | 8/1988 | Rabe | |
| 4,864,715 A | 9/1989 | Sadier | |
| 5,453,412 A | 9/1995 | Deckers et al. | |
| 5,881,778 A | 3/1999 | Barrera | |
| 6,337,529 B1 | 1/2002 | Higashino et al. | |
| 6,601,286 B1 | 8/2003 | Sadiku | |
| 6,787,961 B2 | 9/2004 | Neet et al. | |
| 6,858,963 B2 | 2/2005 | Neet | |
| 6,882,077 B2 | 4/2005 | Neet | |
| 2003/0071534 A1 | 4/2003 | Kreuzer et al. | |

FOREIGN PATENT DOCUMENTS

| | | |
|---|---|---|
| DE | 17 88 053 | 5/1971 |
| DE | 101 58 267 A1 | 6/2003 |
| FR | 2 632 789 A1 | 12/1989 |
| GB | 2052 884 | 1/1981 |

* cited by examiner

*Primary Examiner*—A. Dexter Tugbang
*Assistant Examiner*—Tim Phan
(74) *Attorney, Agent, or Firm*—Stites & Harbison PLLC; Douglas E. Jackson

(57) ABSTRACT

An apparatus in which wave windings with a defined number of waves are cut from a continuously formed wave winding band. In forming with a wire guide, the wave winding band is laid in alternation around the outer side faces of forming protrusions, offset from one another on the circumference of two disks. The two disks can be driven to rotate. In the angular range in which the wave winding band is driven on the circumference of the disks or roller, the spacing between one forming protrusion of one row and the next forming protrusion in the other row is increased by such an amount that the outer side faces of the forming protrusions form the winding heads of the wave windings. The wave windings cut from the wave winding band are introduced into radially outwardly open slots of a lamination packet or a rotorlike transfer tool.

18 Claims, 7 Drawing Sheets

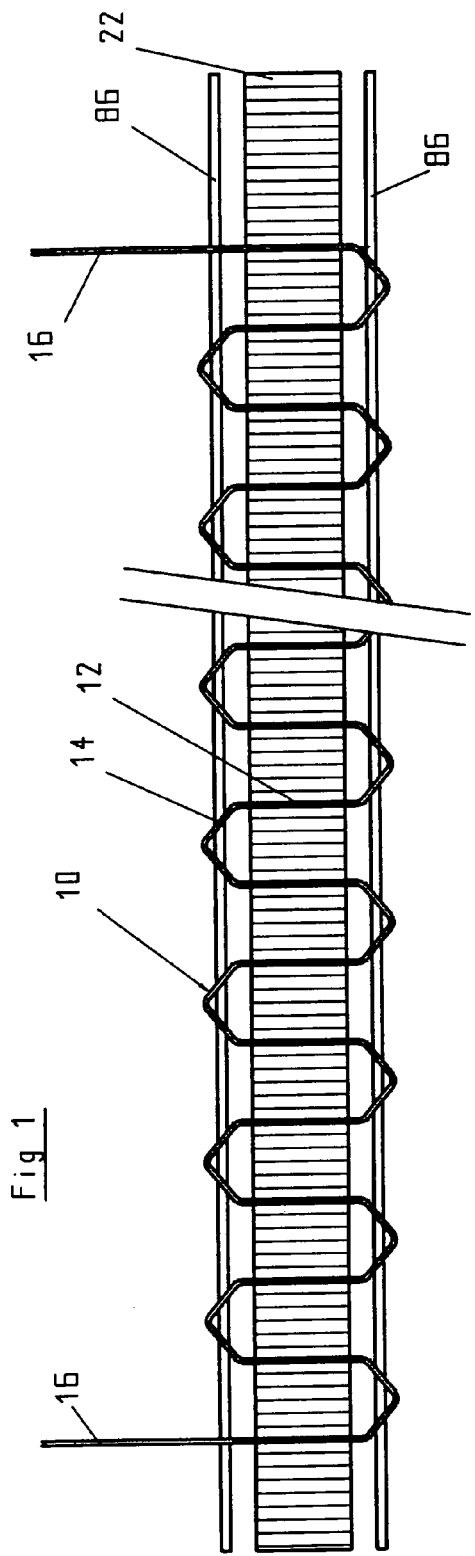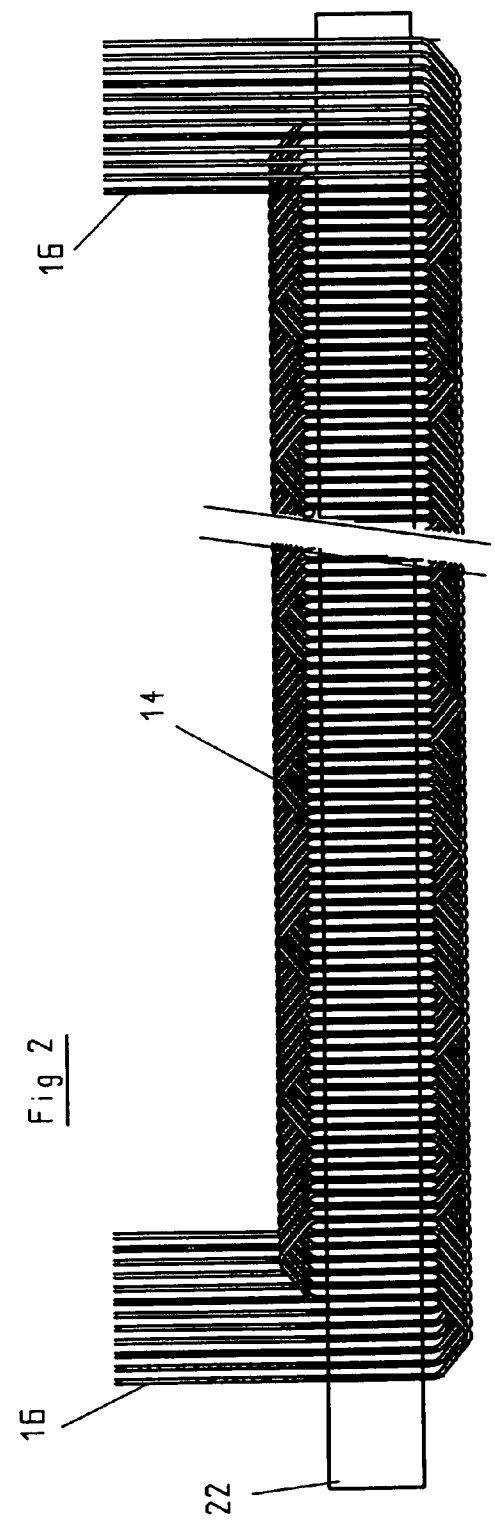

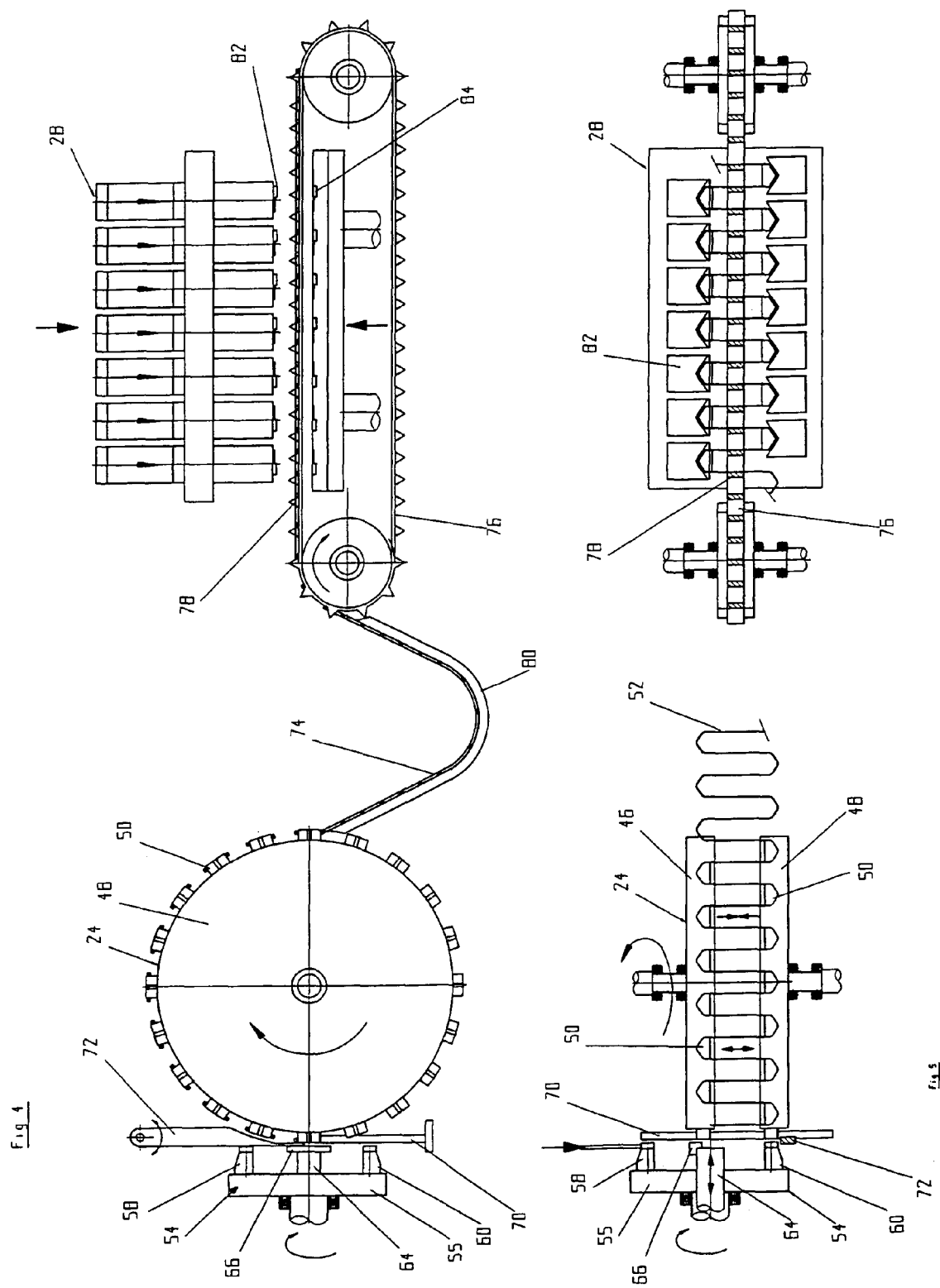

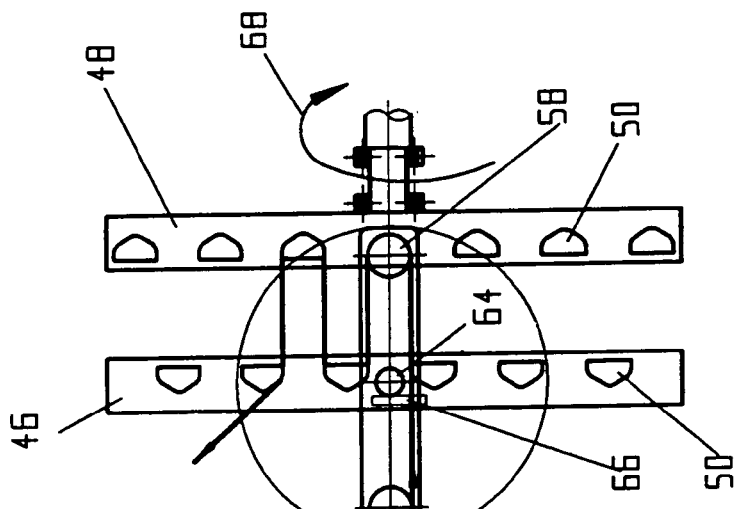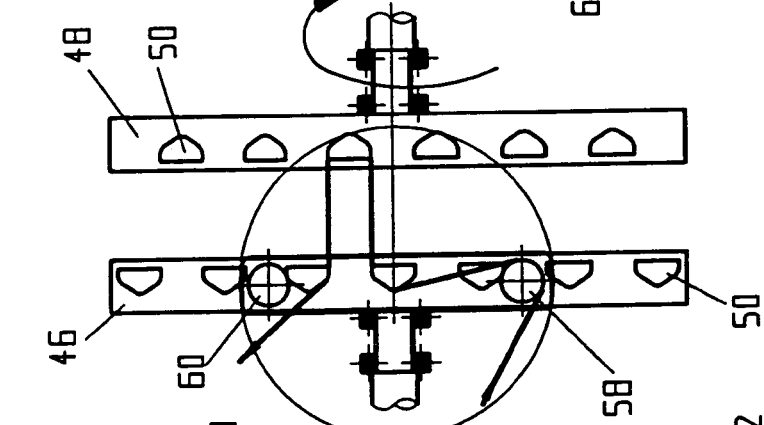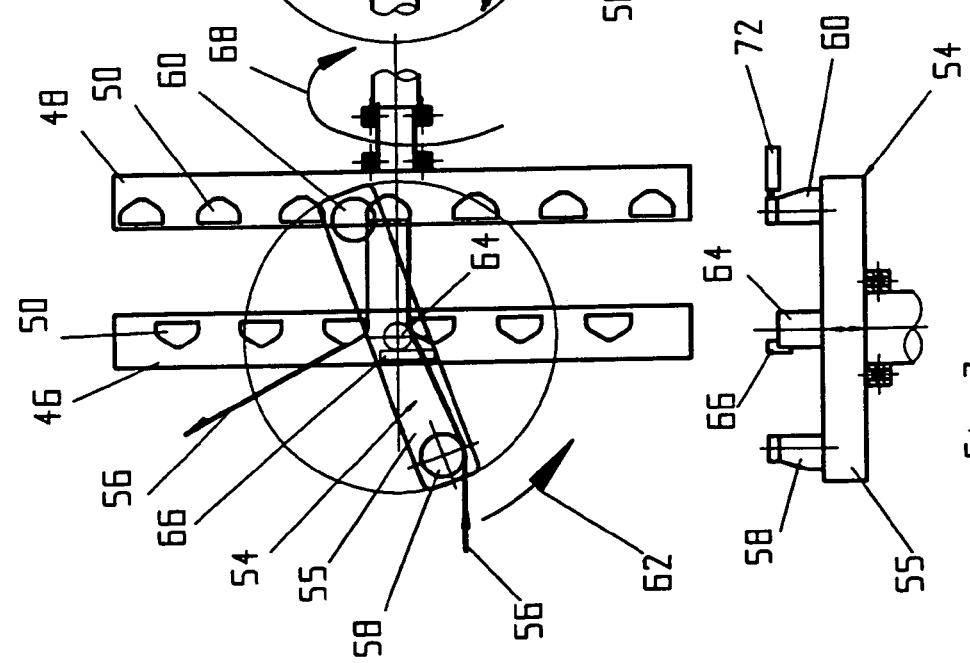

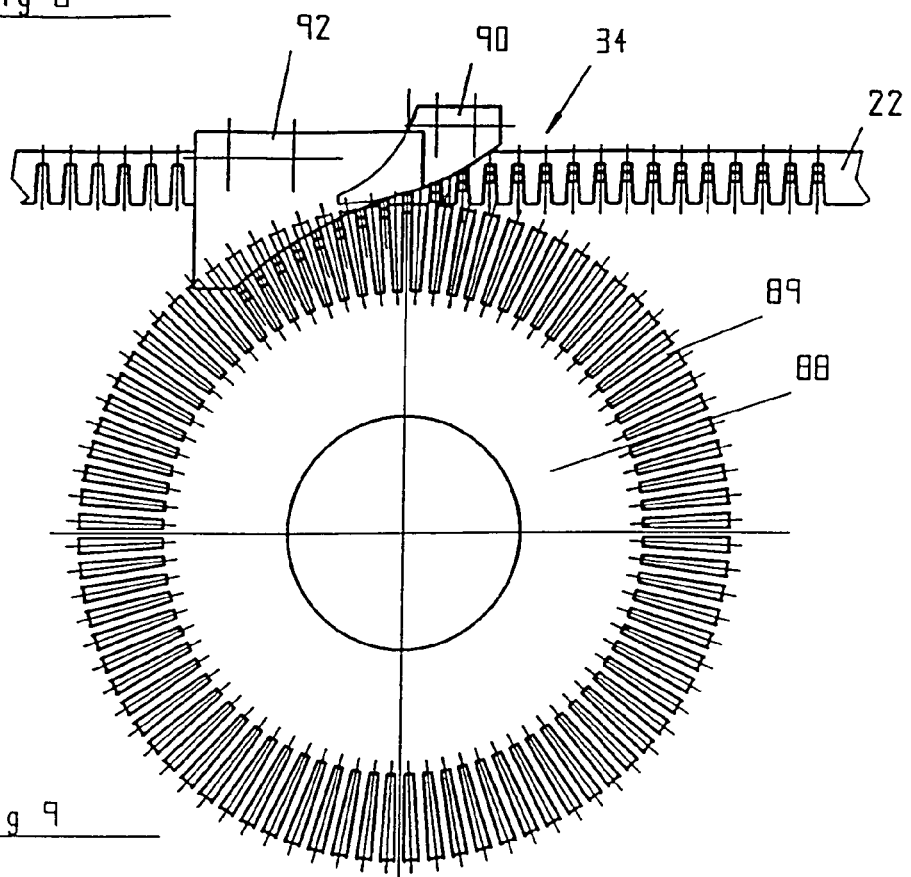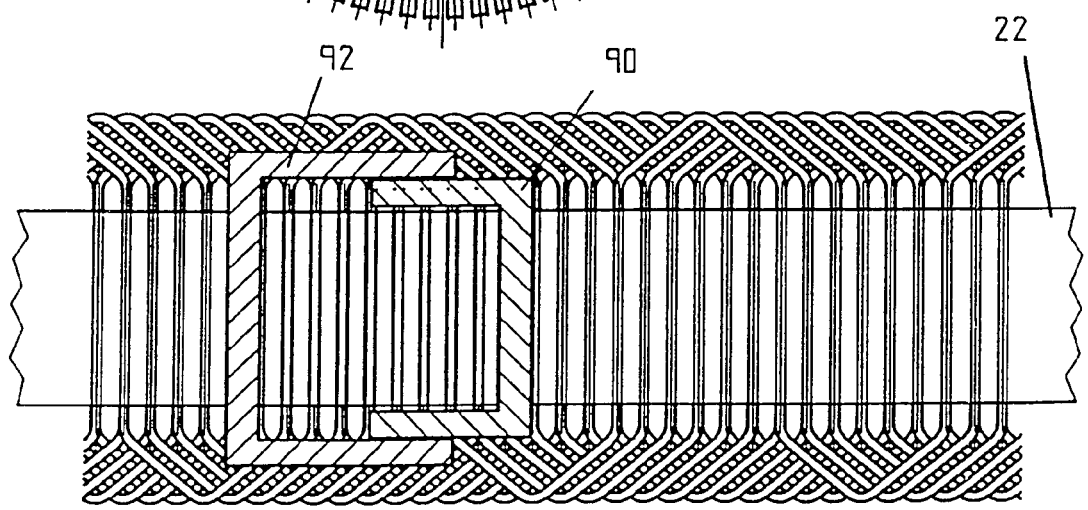

APPARATUS FOR FORMING WAVE WINDINGS FOR ROTOR AND STATOR LAMINATION PACKETS OF ELECTRICAL MACHINES

CROSS REFERENCE TO RELATED DOCUMENT

The present application claims priority to Germany Application No. 103 28 955.0, filed on Jun. 27, 2003.

BACKGROUND OF THE INVENTION

1. Technical Fields

The invention relates to a method and an apparatus for forming and introducing wave windings, with straight portions joined by winding heads, into rotor or stator lamination packets of electrical machines.

2. The Related Art

For a fairly long time, for instance from European Patent Disclosures EP 1 012 951 D1 and EP 0 604 792 A2 as well as U.S. Pat. No. 5,881,778, it has been known to create wave windings, in particular distributed wave windings for producing motor vehicle generators, using a winding nozzle revolving around a template or a template revolving in front of a fixed winding nozzle, and to draw the thus-formed annular wave windings axially into a stator.

In the attempt to attain an optimal filling factor of the stator slots with as little copper as possible and at the same to attain winding heads that are small, well-ventilated and generate only relatively little running noise, stators with many radially inwardly open slots of rectangular cross section have been created in accordance with EP 1 120 881 A2, into which slots wave windings of rectangular coil wire are placed in such a way that in the cross section of a slot the cross sections through the coil wire with a plurality of radial layers form one row extending along the slot and fill up the cross section of the slot. The difficulty in producing a stator of this kind is that the thick rectangular wire, whose width is equivalent to the slot width, can be deformed only with difficulty in a conventional winding and pulling-in process, and normally the winding heads that protrude from the face end beyond the stator lamination packet, because there are so many coil windings that overlap on the circumference and because of the poor deformability of the coil wire, add up to an excessively large radial width, which is practically impossible to reduce using conventional winding head forming tools.

SUMMARY OF THE INVENTION

It is therefore the object of the invention to make a method and an apparatus available with the aid of which wave windings even made of comparatively thick winding wire can be produced and introduced into rotor or stator lamination packets in a simpler way.

BRIEF DESCRIPTION OF THE DRAWINGS

The above object is attained in terms of the method proposed by the invention in that the wave windings, each with a defined number of waves, are cut from a continuously formed wave winding band of winding wire of rectangular or round cross section, which wave winding band, in the forming operation, by a wire guide is laid in alternation around the outer side faces of forming protrusions, offset from one another on the circumference of two disks which can be driven to rotate axially side by side or in two rows on the circumference of a roller that can be driven to rotate, and in the angular range in which the wave winding band is driven on the circumference of the disks or roller, the spacing between one forming protrusion of one row and the next forming protrusion in the other row is increased by such an amount that the outer side faces of the forming protrusions form the winding heads of the wave windings, and that the wave windings cut from the wave winding band are introduced into radially outwardly open slots of a rotor or stator lamination packet or a rotorlike transfer tool.

The invention offers the advantage that in a single integrated operation the winding wire is continuously brought into the shape of a wave fixed by stops and then, under tension, assumes the final wave form by plastic deformation. A total of only two very simple forming operations is needed; that is, besides the aforementioned bending of the wire into the wave winding band, only bending of the wave windings, cut to the proper length from the wave winding band, into a ring with the relatively large radius of curvature of the annular arrangement of the wave winding in the lamination packet is necessary.

The apparatus proposed according to the invention for performing the novel method has a forming device for forming the wave winding band, which forming device has two disks or one roller and two rows of forming protrusions distributed uniformly over the circumference and offset from one another relative to the respectively other row and protruding past the circumference of the disks or roller, and one wire guide guided in such a way that a winding wire can be placed in undulating fashion in alternation about the outer side faces of the successive forming protrusions on the circumference, whose shape corresponds to the shape to be generated of the winding heads of the wave windings, and a device for introducing the wave windings, cut from the wave winding band, into radially outwardly open slots of a rotor or stator lamination packet or rotorlike transfer tool.

This apparatus offers the advantage that it is fundamentally independent of whatever the wave shape, length and relative position to one another the wave windings to be introduced into the rotor or stator lamination packet have. It can therefore be used for many different shapes of the winding. If the wave windings are to be introduced into a rotor or stator lamination packet having radially inwardly open slots, or in other words into an external stator or into the rotor of an external-rotor motor or generator, the aforementioned transfer tool is used with one additional work operation, in order for the windings initially created in the transfer tool to be positively displaced out of its slots radially outward into the slots of the external stator or external rotor.

Advantageous features of the method and the novel apparatus described above are defined in the dependent claims.

Figure 3:
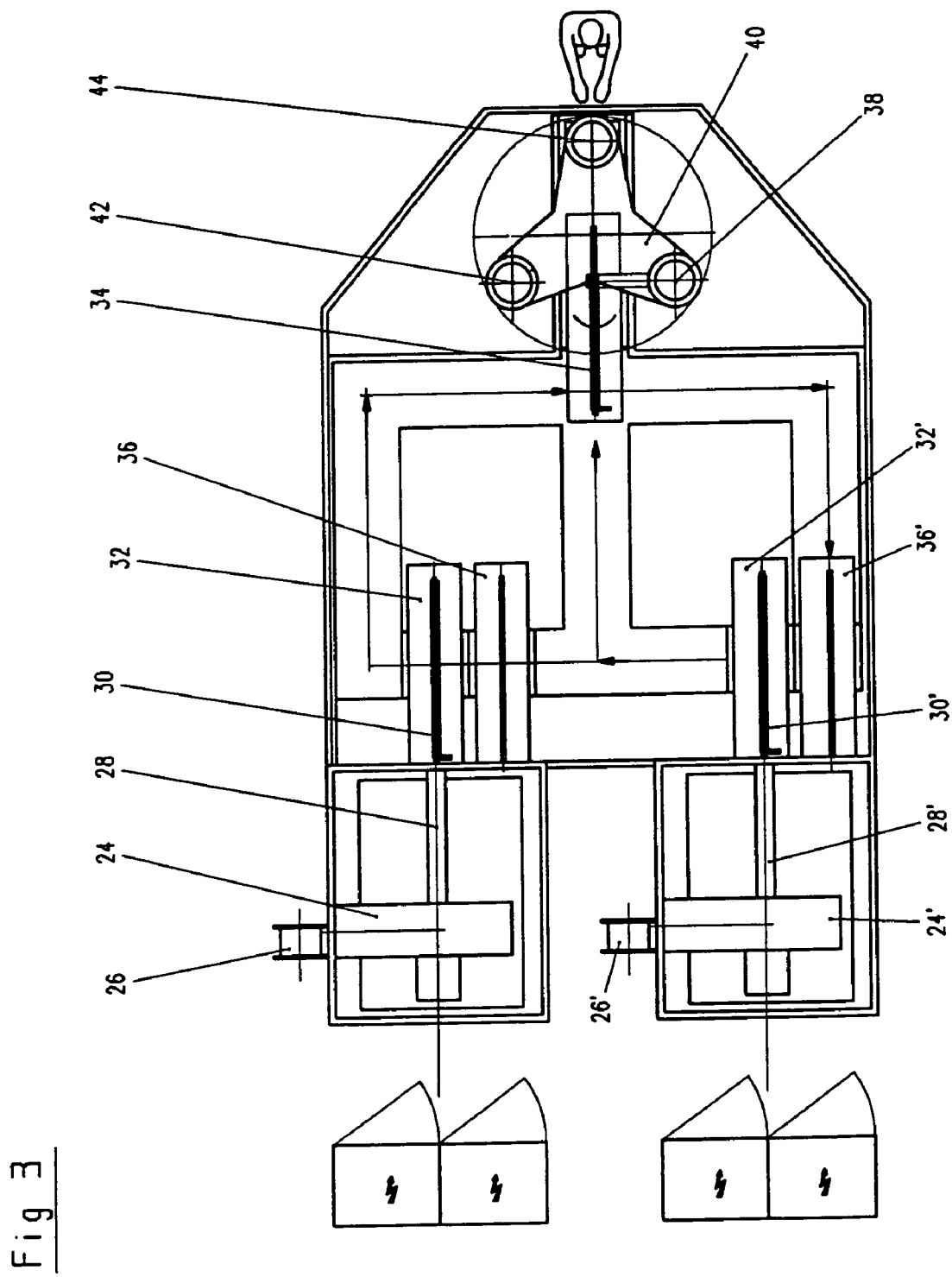
Figure 10:
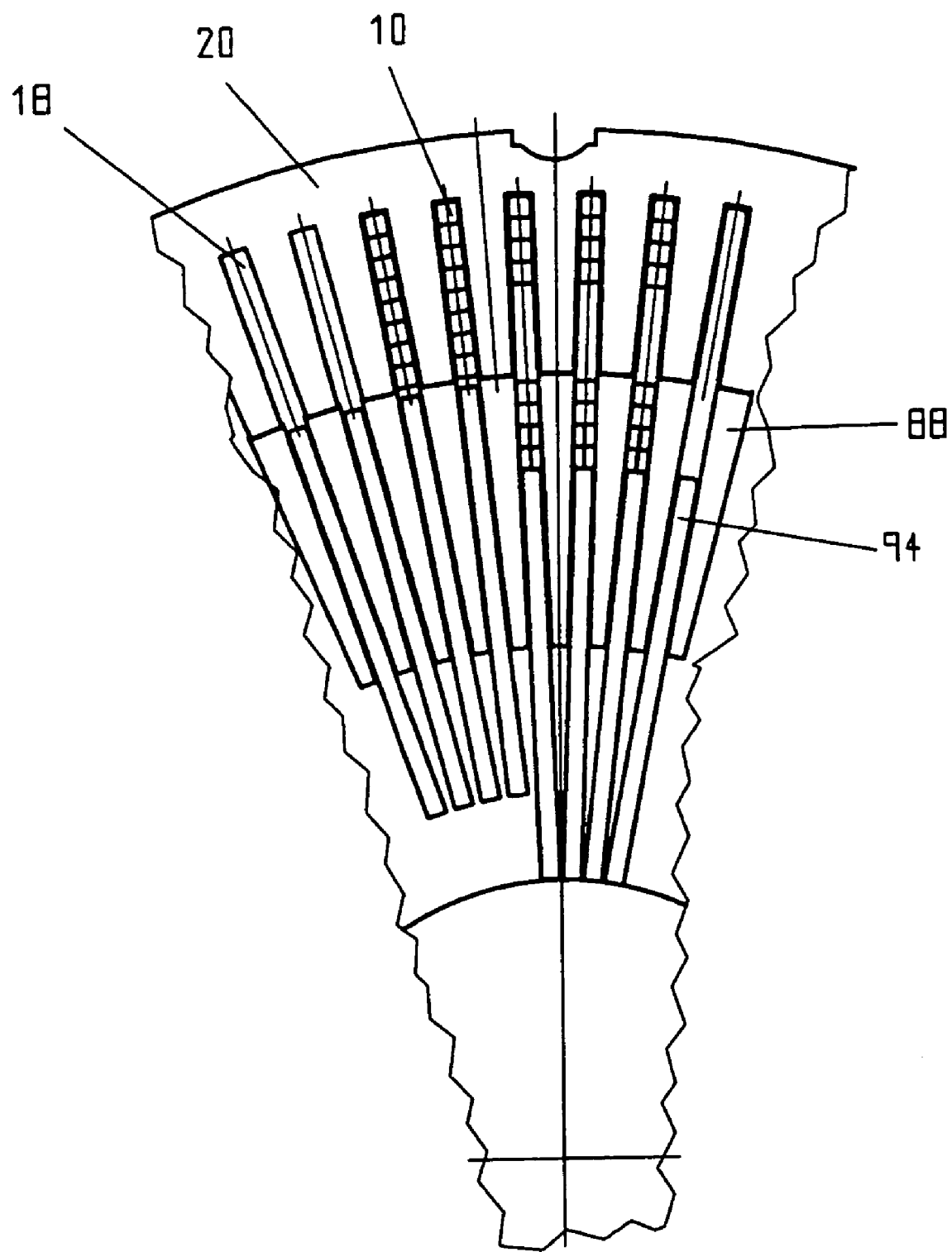
Figure 11:
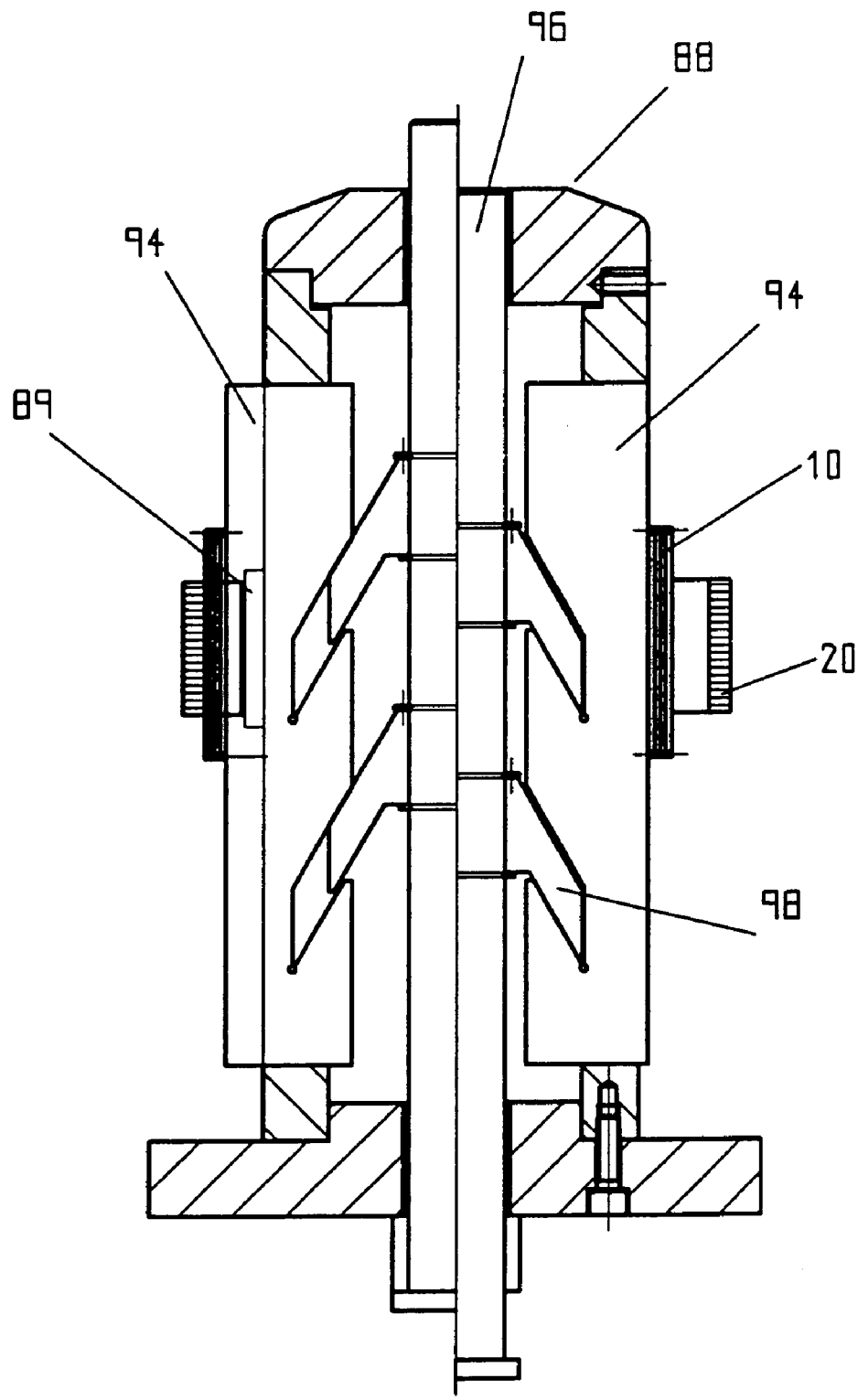

Exemplary embodiments of the invention will be described in further detail below in conjunction with the accompanying drawings in which:

FIG. 1 is a plan view of a wave winding in front of a rod-shaped receiver and lateral guide rails;

FIG. 2 is a plan view of twelve wave windings, placed in the rod-shaped receiver of FIG. 1, which are then inserted jointly into a rotor or stator lamination packet or into a rotorlike transfer tool;

FIG. 3 is a plan view of a system, comprising a plurality of component devices, for forming and introducing wave windings into stator lamination packets;

FIG. 4 is a side view of a device for continuous forming of a wave winding band with a stamping device connected to it;

FIG. 5 is a plan view of the forming device and the stamping device of FIG. 4;

FIGS. 6A, B, C are side views, from the left in terms of FIG. 4, of the device for forming a wave winding band, showing the parts of the device in various stages during the forming of a wave winding;

FIG. 7 is a top plan view of the wire guide that forms part of the device for forming the wave winding band;

FIG. 8 is a simplified side view of a rotor or stator lamination packet or transfer tool having radially outwardly open slots, in cooperation with the rod-shaped receiver shown in FIGS. 1 and 2 and having guide devices for transferring the wave windings from the receiver into the lamination packet or into the transfer tool;

FIG. 9 is a schematic plan view of the rod-shaped receiver and the guide devices, shown in section, of FIG. 8, with the wave windings located in the slots of the receiver also being shown for reasons of clarity in the drawing;

FIG. 10 is a simplified partial cross section through a rotorlike transfer tool, in a concentric position assumed upon the transfer of wave windings into a stator lamination packet; and FIG. 11 is a simplified longitudinal section through the transfer tool of FIG. 10.

DETAILED DESCRIPTION OF EXAMPLARY EMBODIMENTS

The wave winding 10 shown in FIG. 1 has a certain number of waves, formed by parallel straight portions 12 and gable-shaped winding heads 14, the number corresponding to the number and occupation of the slots in the rotor or stator lamination packet to be equipped with these windings. The connection ends of the wave winding are marked 16. In this example, with the wave winding 10 shown, every sixth slot of a stator lamination packet is occupied, and the straight portions 12 extend through the stator slots, while the gable- shaped winding heads 14 protrude from the stator lamination packet at the face end. Between two stator slots occupied by the wave winding 10, five stator slots remain free in this exemplary embodiment, and further such wave windings 10 are introduced into those slots. In all, it is for instance possible for there to be eight layers—this term being understood here to mean one wire layer in one slot 18—to be present in each of the radially inwardly open slots 18, shown as rectangular in cross section in FIG. 10, of a stator lamination packet 20. However, this number of layers is merely one exemplary embodiment. The slots 18 of rectangular cross section could also each be filled with four wire layers of a thicker rectangular wire. Depending on the type of motor or generator and on the selected winding, still other numbers of layers may occur, and even two or more wire layers in one slot can be formed by a single, one-piece wave winding 10. This is the case, for instance, in a so-called distributed wave winding, in which the straight portions are located in two or more layers in the same stator slots, but looking at one end of one of these slots, the winding heads of one or more layers extend from that slot in one circumferential direction while the winding heads of the other layer or layers extend in the opposite direction. Another possible way of filling multiple wire layers of one slot with a single wave winding is to use a wave winding of FIG. 1 that is so long that after being introduced into the stator lamination packet, it extends several times around the circumference thereof.

The advantageousness of the gable-shaped winding heads becomes clear if one imagines, on the basis of FIG. 1, that in the rod-shaped receiver 22 shown there, after the first wave winding 10 shown, a further such wave winding is placed in those slots that are each located directly to the right of the slots that are occupied by the straight portions 12 of the first wave winding 10. The third such wave winding will then in turn be placed in the next slots to the right, and the same is true for the fourth, fifth and sixth wave winding in turn. At the end, it will be seen that it is always only the left leg of the gable-shaped winding heads 14 that has to be laid across the right legs of the winding heads of the wave windings that were already placed earlier but the right legs then need not cross any wave windings put in place earlier. It will also be seen that all the intersection points defined, where a left leg is passed over a right leg of a wave winding put in place earlier, each form the sole intersection at that point. Accordingly, only the crossing left legs of the winding heads need to be lifted either in entirety or partly at the points of intersection and then lowered again into the plane of the straight portions, in order to achieve a situation in which all the straight portions and half of the gable-shaped winding heads of the six wave windings placed in succession are located without internal stress in the cylindrical plane of the wire layer in the slots. The intermittent raising and lowering of half of a gable in order to lay it over one or more gable halves of wave windings put in place earlier can be accomplished by stamping the wave windings before they are placed in the rod-shaped receiver 22. It is understood that alternatively, the gable half with a crossing over it can be lowered, or one gable half can be raised somewhat while the other is lowered somewhat.

It can also be seen from FIGS. 1 and 2 that a wave winding of twice the circumferential length can be folded in the middle and put together so that two straight portions are located one above the other and the winding heads are located oppositely. Alternatively, of two identical wave windings of single circumferential length, one can be inverted and placed on the other and electrically connected to it at one end. The result is once again a distributed wave winding, with two straight portions in each slot and with winding heads directly opposite.

If the wave windings 10 have twice the circumferential length, then upon placement in the slots of the rod-shaped receiver 22, the procedure can also be such that first, in the order described above, the six wave windings that form one wire layer are put in place with only half their length. Next, over the second half of the length of the rod-shaped receiver 22, the order is reversed, so that the winding wire placed last with its first half is placed first into the second half of the receiver 22; the next-to-last wave winding is placed second, and so forth. As a result, in the winding heads of the second wire layer in the stator, the wire intersections are located on the other gable half.

Besides such convolutions, electrical connections and alternations in the order, the further possibility exists upon placement of the wave windings in the slots of the receiver 22 of bending open individual waves of an already-placed wave winding and bending them back again, after the placement of one or more further wave windings, into the slots of the receiver 22; as a result, at a defined point, a variation in the order of wave windings located one above the other is attained.

FIG. 2 illustrates the very uniform arrangement of the winding heads of a multilayer winding.

FIG. 3 in plan view shows an overview over one complete production system for winding and introducing wave windings into stator lamination packets. Reference numerals 24 and 24' designate two parallel-operating forming devices, in each of which a winding wire, drawn from a supply roller 26 and 26', respectively, is formed continuously into a wave winding band, from which the wave windings shown in FIGS. 1 and 2 are obtained in the form of segments. Reference numerals 28 and 28' indicate a respective stamping station, respectively, in FIG. 3, in which the winding heads of the wave windings are formed by male and female dies in such a way that they can cross each other in different planes while their straight portions lie in the same cylindrical plane. Also in this station, the wave windings 10 can be cut to whatever length is required from the continuously produced wave winding band, and the connection ends 16 can be pulled out.

In the next parallel-operating stations, identified by reference numerals 30 and 30', respectively, the wave windings 10 are placed in the intended order and arrangement into the slots of the rod-shaped receiver 22, specifically with as many wire layers in each slot as are placed jointly in a single work step into the slots of a rotor or stator lamination packet or a rotorlike transfer tool. In FIG. 3, a conveyor system with pallets is provided, each pallet carrying one rod-shaped receiver 22 with slots. Once a receiver 22 of FIG. 2 has been loaded with wave windings, the corresponding pallet 32 and 32' moves into the transfer station shown at 34, and a further pallet 36 and 36' moves, carrying an empty rod-shaped receiver 22, after it into the loading station 30 and 30'.

In the transfer station 34, the wave windings are transferred from a rod-shaped receiver 22 first, in this example, to a rotorlike transfer tool having radially outwardly open slots. For details, see the description hereinafter of FIGS. 8 and 9. The filled transfer tool is then moved by a turntable 40 to an insertion station 38, in which the rotorlike transfer tool is introduced into the bore of a stator lamination packet in such a way that its radially inwardly open slots are aligned with the slots of the transfer tool, so that radially movable slides can slide the wave windings out of the transfer tool radially into the slots of the stator lamination packet. After that, the turntable 40 transfers the stator lamination packet into a compression station 42, in which the first group of wave windings put in place in the stator slots are pushed or pulled still farther radially outward, and the winding heads are compressed. Next, a completely wound stator lamination packet is conveyed by the turntable 40 to a discharge station 44 and removed there or discharged. If still a second or further group of wave windings is to be received in the stator lamination packet, then the partly wound stator lamination packet is returned to the insertion station 38 again and equipped with the second or further group of wave windings. This is then followed by a compression operation in the compression station 42, before the stator lamination packet is removed in the discharge station.

It may be expedient for the wave windings produced in the forming device 24' to be formed with somewhat narrower winding heads than in the forming device 24, and in the transfer station 34 and insertion station 38 for first one group of wave windings from the forming device 24 and then one group of wave windings from the forming device 24' to be introduced in alternation into the stator lamination packet by means of suitable transfer tools. With the winding heads of different widths, the different radii of the wave windings after their introduction into the stator lamination packet can be taken appropriately into account.

FIGS. 4, 5 and 6A, B, C show the forming device 24 in more detail, and FIGS. 4 and 5 also show the stamping device 28. The primary components of the forming device 24 are two continuously revolving disks 46, 48, located axially side by side, each having forming protrusions 50 extending beyond the circumferential surface. In the continuous creation of a wave winding band 52, the disks 46, 48 cooperate with a wire guide 54, which is supported immediately next to the circumference of the disks 46, 48, rotating incrementally about a horizontal axis. The forming of the winding wire, delivered from the supply 26, to form the wave winding band 52 can be best understood from the simplified schematic illustration in FIGS. 6A, 6B and 6C.

At the beginning of the continuous forming operation, the beginning of the winding wire, marked 56, as shown in FIG. 6A is temporarily clamped or otherwise retained on a forming protrusion 50 of the left disk 46 and placed as a loop around the next forming protrusion 50, following it in the circumferential direction, of the right disk 48. If the wire guide 54, which comprises a rotatably supported carrier 55, for instance in the form of a disk or a bar, and diametrically opposed looping pegs 58, 60 mounted near the outer circumference and protruding axially toward the disks 46, 48, subsequently begins to rotate as indicated by the directional arrow 62, then in the example of FIG. 6A the looping peg 58 strikes the winding wire 56 arriving from the supply 26 and begins to form a loop on its circumference. At the same time, the looping peg 58 also guides the winding wire around one forming protrusion 50 of the left disk 46, on whose circumferential surface it is retained by a tappet 64, which is disposed centrally on the carrier 55 or extends nonrotatably through the carrier 55 and is thrust forward axially against the forming protrusion. The tappet is preferably embodied with a retaining lug 66 on its free end, which lug pushes the wire far enough onto the forming protrusion 50. Thus in the phase shown in FIG. 6A, a loop is simultaneously formed both on the aforementioned forming protrusion 50 of the disk 46 and on the looping peg 58. Upon further rotary motion of the wire guide 54 in the direction of the directional arrow 62 and with simultaneous rotation of the disks 46 and 48 in the direction of the directional arrow 68, the wrap angles of the two loops increase, as the intermediate stage shown in FIG. 6B illustrates. In that stage, the looping pegs 58 and 60 are approximately vertically one above the other in front of the disk 46. The tappet 64 has been retracted from the disk 46, because in the meantime the wire loop on the protrusion 50 of the disk 46, rotated some distance onward, holds by itself.

In the phase of FIG. 6B, to prevent the winding wire 56 from striking the next forming protrusion 50 of the disk 46 that follows the forming protrusion 50 that forms the loop, a guide baffle 70 shown in FIG. 4 is provided, which guides the winding wire 56 past the next forming protrusion 50.

Once the wire guide 54 has been rotated onward and has reached the position of FIG. 6C, a forming protrusion 50 of the disk 48 is located axially immediately in front of the looping peg 58. The rotary motion of the wire guide 54 is briefly interrupted, and a stripper 72, shown in FIGS. 4 and 7, strips the wire loop seated on the looping peg 58 axially from it and over onto the forming protrusion 50 located in front of it. Simultaneously or immediately afterward, the tappet 64 moves axially forward again and pushes the wire 56 over, that is downstream in terms of the direction of motion of the forming protrusion 50 of the disk 46 past which it has just beforehand been moved by the guide baffle 70, so that this forming protrusion now forms the next loop.

After this, the above-described events are repeated, if with continued rotation the looping peg 60 reaches the position in which the looping peg 58 is located in FIG. 6A. As shown in the drawings, the forming protrusions 50 on the two disks 46 and 48 are offset with a forming protrusion on one disk facing a gap between forming protrusions on the other; the intermediate spacing measured at the circumference between one forming protrusion 50 on one disk and the immediately following forming protrusion 50 on the other disk is approximately equal to the diameter of the winding wire 56. Since the continuous rotary motion of the disks 46 and 48 is adapted to the uninterrupted rotary motion of the wire guide 54 in such a way that a wire loop is transferred successively to each forming protrusion 50 of both disks 46, 48, the overall result is the uninterrupted wave winding band 52.

To obtain a rotary motion with brief interruptions for the wire guide 54 in the particular phase in which wire loops are stripped from the looping pegs 58, 60 onto the forming protrusions 50 of the disk 48, a suitable indexing mechanism, for instance in the form of a Maltese-cross drive mechanism, can be used.

The drawing off of wire from the wire supply 26 includes a wire brake. The winding wire 56 is therefore under tensile stress during the formation of loops around the forming protrusions 50, and as the wire loops are being deposited onto the forming protrusions 50, a certain forming into waves or zigzag shape takes place. The tensile stress in the winding wire would normally, however, not suffice to form the gable-shaped winding heads 14 exactly with their angles and straight intermediate segments, even if the forming protrusions 50 have a cross section corresponding to the form of the winding heads 14. To achieve the desired form of the winding heads 14, it is therefore provided that the distance between the co-operating forming protrusions 50 of both circumferential rows on the disks 46, 48, in the circumferential region in which the wave winding band 52 is transported from the loop-forming point to the point where it is paid out from the disks 46, 48, is first increased by a certain amount that suffices to achieve a relatively high tensile stress required for the shaping of the winding wire and then reduced again.

If the forming protrusions 50 are mounted, axially controllably displaceably, on a wide roller with the intended intermediate spacing, the roller can simultaneously rotate about a straight axis. Conversely, if instead of a wide roller two disks 46, 48 are used, then the forming protrusions 50 need not execute a relative axial motion, because then it suffices for the disks 46, 48 to be supported such that during the rotary motion the spacing between two obliquely opposed forming protrusions that carry the wave winding band is first increased and then reduced again. In the simplest case, for this purpose, the axes of rotation of the two disks 46, 48 can be inclined, dropping off laterally toward the outside. The spacing between the two disks 46, 48 and thus between the obliquely opposed forming protrusions 50 is then greatest at the top and least at the bottom, and at the point of loop formation is approximately the same size as at the point where the wave winding band 52 is paid out from the disks 46, 48. Along the way from the loop-forming point to the payout point, the intermediate spacing between the forming protrusions 50 therefore increases, as desired, and then becomes less again. It is understood that still other supports for the disks 46, 48 that generate a tumbling motion of the disks with the aforementioned effect could be selected.

Finally, it should be noted that for creating gable-shaped winding heads 14, it is not necessary to use forming protrusions 50 with a matching cross-sectional shape. The latter could instead be replaced by three pins each, for instance, which are seated at those points where the laterally outermost corners of the forming protrusions 50 are located. Producing the pins is more economical than producing the forming protrusions 50.

It is understood that instead of the gable-shaped cross section, the forming protrusions 50 can have some other shape suitable for winding heads instead. The same is correspondingly true for the arrangement of the pins alternatively used.

At the point on the circumference of the disks 46, 48 that in this example is approximately opposite the loop-forming point, a deflection baffle disposed in the interstice between the disks 46, 48 can assure that the wave winding band 52 will detach reliably from the forming protrusions 50 and initially will form a freely suspended loop 74, before the wave winding band 52 is grasped by drivers 78 on a conveyor belt 76 which can be driven to revolve endlessly and conveyes the wave winding band 52 to the stamping device 28. The freely suspended loop 74 fluctuates in its length during operation and forms a buffer store, which compensates for the uneven draw-off speed, resulting from times when the conveyor belt 76 is not moving, in comparison to the uniform feeding speed of the disks 46, 48. The loop 74 can optionally be supported by a flexible guide 80 that is resiliently yielding when loaded with weight, to prevent excessive lengthening of the wave winding band 52 from its own weight.

The stamping station 28 has the function of deforming the winding heads 14 perpendicular to the plane of the wave winding band 52 in such a way that the winding heads, which overlap in the mounted state in the stator lamination packet, do not hinder one another, and the wave windings 10 of the same wire layer, for instance the radially outermost wire layer, can be placed in the stator slots in their appropriate position with as much freedom from tension as possible, so that the intersecting winding heads need not be pressed against one another in the insertion process to such an extent that they deform and allow the straight portions of the wave windings 10 to assume their intended position in the stator slots.

Depending on the intended object, the male dies 82 and female dies 84 are dimensioned and shaped such that in each stamping operation one or more winding heads 14, in their entirety or in part, can be forced out upward or downward relative to the primary plane of the wave winding band 52. In this way, with a sufficient number of dies, all the winding heads 14 of one wave winding 10 can be simultaneously formed with a single stroke. Alternatively, the possibility exists of forming the winding heads 14 of a wave winding 10 in multiple strokes using fewer dies 82, 84. Normally, the conveyor belt 76 will be stopped during the shaping, and in that period of time the disks 46, 48 feed the wave winding band 52 created into the loose loop 74 acting as a buffer store. If a high production capacity is desired, then the male dies 82 and female dies 84, in conjunction with a longer conveyor belt 76, can also be operated in flying fashion, so that during the shaping operation, they are moved parallel to the conveyor belt 76 at the speed of that belt. In such a mode of operation, the freely suspended loop 74 is not needed.

Besides the dies 82, 84, cutting tools not shown are also mounted in the stamping device 28; they sever the wave winding band 52 at predetermined points in order to obtain wave windings 10 of a certain length. The wire ends of the cut-off wave windings are drawn out by grippers, not shown, to the connecting ends 16 shown in FIGS. 1 and 2. The straight portions 12 can also be converted from wave windings made of round wire into a rectangular cross section in the stamping device 28 or in a further forming station.

The stamping device 28 is optionally also adjoined by a further work station, in which by machine or by hand a long wave winding 10 is folded back onto itself in such a way that a distributed wave winding of half the length is created. Alternatively, two wave windings 10 can be placed one over the other to form a distributed wave winding and electrically connected to one another at one end. The possibility also exists of intersecting one or more wave windings, which are intended to be located side by side in different slots, at certain points in such a way that over a portion of its length, one wave winding is located under another wave winding, but over another portion of its length it is located above it.

In the next work step, the wave windings 10 formed as described above are placed in the loading station marked 30 in FIG. 3 in the transverse slots of the rod-shaped or toothed-rack-shaped receiver 20 shown in FIGS. 1 and 2 and also in FIGS. 8 and 9. To that end, an endless conveyor belt of the type of the conveyor belt 76 successively carries a plurality of wave windings 10, whose winding heads 14 are guided in the guide rails 86 shown in FIG. 1, into the respective predetermined position above or below certain transverse slots of the rod-shaped receiver 22. Then the wave windings 10 are introduced into the transverse slots of the rodlike receiver 22 by raising or lowering the guide rails 86 or alternatively by raising or lowering the rod-shaped receiver. It is understood that the possibility also exists of introducing the wave windings 10 into the slots of the rod-shaped receiver 22 from above and then inverting them along with the wave windings in place, in order to bring them to the position shown in FIG. 8.

In FIG. 8 the transfer of the wave windings from the rod-shaped receiver into a rotor magazine or rotorlike transfer tool 88 with radially outwardly open slots 89 is shown. This process takes place in the transfer station, shown at 34 in FIG. 3. A rotor or stator lamination packet with radially outwardly open slots could be present there, instead of the transfer tool 88.

In FIG. 8, for the operation of transfer, the rod-shaped receiver 22 is oriented tangentially relative to the rotorlike transfer tool 88, or to a rotor or stator lamination packet located at its position; the slots of the rod-shaped receiver 22 and the slots 89 of the transfer tool 88 face one another with their openings. In addition, the spacing of the slots and the relative motion of the receiver 22 and the transfer tool 88 are adapted to one another in such a way that at the tangential point of contact, the two opposed slots are aligned with one another. In the exemplary embodiment of FIG. 8, during the transfer operation, the transfer tool 88 executes a rotary motion counterclockwise about a stationary axis, while simultaneously the rod-shaped receiver 22 is displaced rectilinearly from right to left along a linear guide, not shown, at the circumferential speed of the transfer tool 88. While these coordinated motions are taking place, two guide devices 90, 92 that are U-shaped in plan view, in the region of the tangential point of contact and the region behind it in the direction of motion, press the wave windings 10, which until then may optionally be retained by guide rails corresponding to the guide rails 86 in the slots of the receiver 22, out of the slots of the receiver 22, into the respective opposed slots of the transfer tool 88. Since the rod-shaped receiver 22 of FIGS. 1, 2 and 9 is narrower than the length of the straight portions 12 of the wave windings 10, the U-shaped guide devices 90, 92 on both sides next to the rod-shaped receiver 22 can engage the outer regions of the straight portions 12 and the winding heads 14, in order to positively displace the straight portions successively out of the slots of the receiver 22 and push them into the slots of the transfer tool 88.

Instead of the two guide devices 90, 92, a single, larger guide device could also be used. Alternatively, it would be possible to provide machine-actuatable tappets or slides, which with one or two strokes each push the straight portions, retained in a slot of the receiver 22, into the opposite slot of the transfer tool 88.

The tangential disposition, shown in FIG. 8, of a rectilinearly rod-shaped receiver 22 relative to the rotorlike transfer tool 88 makes do with very simple motion drive mechanisms for the transfer operation. If one is willing to dispense with that, then it is also possible according to the invention to use a rod-shaped receiver 22 that is curved upward or downward in terms of FIG. 8 by a certain radius, because then as well, at the point of contact of the transfer tool 88, there is an essentially tangential orientation and relative motion. In all cases, while the respectively other part is fixed, either the transfer tool 88 or the rod-shaped receiver 22 can be guided in a combined motion such that a relative rolling motion that permits the transfer of the wave windings comes about.

How many wave windings will be transferred in one operation from the rod-shaped receiver 22 onto the transfer tool 88 and from the transfer tool onto a rotor or stator lamination packet with radially inwardly open slots depends on the individual case. Normally, two transfer operations will usually suffice.

FIGS. 10 and 11 show a partial cross section through the rotor magazine or transfer tool 88 on a larger scale and a longitudinal section through it during the radial insertion of the wave windings 10 into the radially inwardly open slots 18 of a stator lamination packet 20. For this transfer operation, the stator lamination packet 20 is placed in that rotary position axially onto the transfer tool 88, or the transfer tool is inserted into the bore of the stator 20, in such a way that the radially inwardly open slots 18 are aligned with the radially outwardly open slots of the transfer tool 88. Then the wave windings seated in the slots of the transfer tool are positively displaced relatively outward, by lamination-like slides 94 seated in the same slots, into the slots 18 of the stator lamination packet 20. FIG. 10 by way of example shows three slots 18 into which four wire layers of wave windings have already been inserted in an earlier transfer operation, while four further wire layers of wave windings are still seated in the corresponding slot 89 of the transfer tool 88 and must be displaced in the next transfer operation radially outward into the aligned stator slot by the associated slide 94. Other stator slots, of rectangular cross section, have already been completely filled by eight wire layers of wave windings of suitable cross section.

There are various possible ways of radially extending and retracting the slides 94 by means of power cylinders or worm drives. One simple exemplary embodiment is shown in FIG. 11. It has lamination-like slides 94, which are guided radially displaceably but axially fixed in the radially outwardly open slots of the transfer tool 88. To move them radially, a power cylinder or other drive mechanism displaces a central drive rod 96, on which conical or wedge-shaped disks 98 are fixedly mounted, whose front and rear parallel wedge-shaped faces, extending obliquely to the longitudinal axis, engage correspondingly obliquely disposed recesses in the lamination-like slides 94. Thus a motion of the drive rod 96 upward in terms of FIG. 11 causes the slides 94 to be radially spread apart and as a result causes the positive displacement of the wave windings, seated in the slots 89 of the transfer tool 88, into the stator slots 18. By retraction of the drive rod 96 downward, after the transfer operation, the slides 94 are drawn radially inward again.

As an alternative to the disks 46, 48, disks of infinitely great diameter corresponding to rods, with forming protrusions 50 mounted on them, or analogously to the aforementioned roller, one rod with two rows of transversely displaceable forming protrusions in cooperation with a wire guide 54, could form the forming device for bandlike wave windings 10. In that embodiment, all the other elements and provisions described above can be retained unchanged or adopted appropriately.

The invention claimed is:

1. An apparatus having
    a forming device for forming a wave winding band and
    a device for introducing wave windings cut from this band into radially outwardly open slots of a cylinder member which is one of a rotor or stator lamination packet or a similar transfer tool,
    characterized in that the forming device for the wave winding band has
        a rotatable device which is one of two rotatable disks or one rotatable roller and
        two rows of forming protrusions distributed uniformly over the circumference of the rotatable device and offset from one another relative to the respectively other row and protruding past the circumference of the rotatable device, and
        a wire guide guided in such a way that a winding wire can be placed in undulating fashion in alternation about outer side faces of the successive forming protrusions on the circumference, the outer side faces having a shape which corresponds to a shape to be generated of winding heads of the wave windings.

2. The apparatus of claim 1, characterized in that a free spacing measured at the circumference between one forming protrusion of one row and the next forming protrusion in the other row is equivalent to the thickness of the winding wire.

3. The apparatus of claim 1, characterized in that in plan view on the circumference of the rotatable device, the outer side faces, pointing away from one another, of the forming protrusions each have the shape of a gable.

4. The apparatus of claim 1, characterized in that, along the circumferential length traversed by a wave winding on the rotatable device, the axial spacing between one forming protrusion of one row and the next forming protrusion of the other row can initially be increased and then reduced.

5. The apparatus of claim 4, characterized in that each row of forming protrusions is mounted on a disk that is supported individually in tumbling or oblique fashion such that the spacing between the two rows along the circumferential length traversed by the wave winding is initially increased and then reduced, and as a result of the increase in spacing, the winding wire, drawn tautly against gable-shaped outer side faces of the forming protrusions, is formable with corresponding gable-shaped winding heads.

6. The apparatus of claim 1, characterized in that
    the wire guide is a carrier driven to rotate about an axis of rotation located essentially transversely to the axis of rotation of the rotatable device and has at least one eccentric looping peg and one tappet that can be axially advanced in controlled fashion and is disposed essentially on the axis of rotation,
    the carrier having the at least one looping peg immediately next to the rotatable device revolves in chronological adaptation to the rotary motion thereof,
    in a first intermediate phase of a work cycle, the tappet can be advanced to the winding wire, delivered into the space between the carrier and the rotatable device, and to a forming protrusion of one row, so that the winding wire is retained on this forming protrusion to form a first loop, and
    in a second intermediate phase, in which a forming protrusion of the other row is located axially in front of the at least one looping peg, a stripper can be actuated by which a second loop formed from the winding wire on the at least one looping peg can be stripped from the at least one looping peg onto the forming protrusion located in front of the at least one looping peg.

7. The apparatus of claim 6, characterized in that the carrier revolves in the direction of rotation in which the at least one looping peg, moved with a circumferential surface against the winding wire, forms the first loop around a forming protrusion of one row and simultaneously forms the second loop around the at least one looping peg.

8. The apparatus of claim 6, characterized in that the carrier of the at least one looping peg revolves discontinuously.

9. The apparatus of claim 6, characterized in that, for varying the height of the wave windings to suit different lamination packet heights, the maximum axial spacing between the two rows of forming protrusions and the eccentricity of the at least one looping peg on the carrier are variably adjustable.

10. The apparatus of claim 1, characterized in that a stamping device is disposed between the forming device and a loading station for placing the wave windings in rod-shaped receivers, which stamping device has
    (a) a conveyor means adapted to convey the wave winding with drivers mounted on an outside thereof at a spacing of adjacent straight portions of the wave windings, and
    (b) one or more male dies and female dies laterally beside the conveyor means, by which said dies at least part of one winding head of a wave winding to be placed in the receiver can be forced out of the plane of the adjacent straight portions.

11. The apparatus of claim 10, characterized in that the stamping device has cutting tools for cutting the wave windings to a proper length from the wave winding band.

12. The apparatus of claim 10, characterized in that, between the forming device and the stamping device, there is a loose guide for the formed wave winding band, so that by use of this band a loop of variable length serving as a buffer store can be formed.

13. The apparatus of claim 10, characterized in that the loading station for placing the wave windings in rod-shaped receivers has
    movably supported guide rails extending parallel to one another and to the receiver and extending in projection at the sides of the receiver, which said rails guide the winding heads of the wave windings,
    an endlessly revolvingly guided conveyor belt which can be controlled with precise positioning, said drivers provided on an outside thereof with a same spacing as the straight portions, and a positioning drive mechanism for moving the guide rails out of a position in front of slot entrances provided in the rod-shaped receiver into a position at the sides of the slot entrances, whereby the straight portions of the wave windings are introduced into slots of the receiver.

14. The apparatus of claim 1, characterized in that the device for introducing the wave windings into the cylinder member has a guide for the wave windings which is disposed essentially tangentially relative to the cylinder member having radially outwardly open slots and that can be driven to rotate by a rotary mechanism, a drive for relative advancement of the wave windings having straight portions joined by the winding heads and/or of the cylinder member along the guide at a speed corresponding to the circumferential speed of the cylinder member, and guide or thrust devices by which the straight portions, brought to the cylinder member, of the wave windings can be introduced in succession into the radially outwardly open slots.

15. The apparatus of claim 14, characterized in that the guide has a longitudinally movable rod-shaped receiver with parallel transverse slots, into which said receiver a plurality of wave windings, to be introduced jointly into the cylinder member in one work step, can be placed with the straight portions thereof in predetermined transverse slots.

16. The apparatus of claim 15, characterized by stationary guide devices engaging the outer regions of the straight portions and/or the winding heads of the wave windings, by which said guide devices the straight portions can be positively displaced into the radially outwardly open slots of the cylinder member while the cylinder member rotates about a stationary axis and in the process rolls along the rod-shaped receiver that is moved past the cylinder member at a tangent or along a line parallel to the cylinder member.

17. The apparatus of claim 16, characterized in that where the cylinder member is a rotorlike transfer tool, in the radially outwardly open slots thereof there are radially displaceably guided slides which can be moved to beyond the outer circumference and by which the wave windings received in the radially outwardly open slots can be positively displaced into aligned, radially inwardly open slots of a rotor or stator lamination packet disposed concentrically to the transfer.

18. The apparatus of claim 17, characterized in that the axially fixed slides are provided with wedge-shaped faces and are movable radially by corresponding wedge-shaped or conical faces of a common, axially movable drive member.

* * * * *

UNITED STATES PATENT AND TRADEMARK OFFICE
CERTIFICATE OF CORRECTION

PATENT NO. : 7,185,414 B2  Page 1 of 1
APPLICATION NO. : 10/635903
DATED : March 6, 2007
INVENTOR(S) : Sadiku et al.

It is certified that error appears in the above-identified patent and that said Letters Patent is hereby corrected as shown below:

On the cover page, the inventor field should read as follows:
 (75) Inventor: Sadik Sadiku, Neuberg, (DE) --; Keith A. Witwer, Fort Wayne, IN (US)--

Signed and Sealed this

Tenth Day of November, 2009

David J. Kappos
*Director of the United States Patent and Trademark Office*